(12) United States Patent  
Paterik et al.

(10) Patent No.: US 7,698,435 B1  
(45) Date of Patent: Apr. 13, 2010

(54) DISTRIBUTED INTERACTIVE MEDIA SYSTEM AND METHOD

(75) Inventors: Thomas Paterik, Kansas City, MO (US); Virender Kumar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1345 days.

(21) Appl. No.: 10/414,545

(22) Filed: Apr. 15, 2003

(51) Int. Cl.
G06F 15/16 (2006.01)

(52) U.S. Cl. .................. 709/227; 709/223; 709/249; 709/218; 709/220; 370/352; 370/353; 379/45; 379/46

(58) Field of Classification Search .......... 709/200, 709/218–229, 249, 250; 370/352, 401, 229; 704/270, 275; 379/88.18, 88.1
See application file for complete search history.

(56) References Cited

U.S. PATENT DOCUMENTS

| | | | |
|---|---|---|---|
| 4,785,408 A | | 11/1988 | Britton et al. |
| 5,729,600 A | | 3/1998 | Blaha et al. |
| 5,946,386 A | * | 8/1999 | Rogers et al. .......... 379/265.09 |
| 5,958,013 A | * | 9/1999 | King et al. .................. 709/227 |
| 5,964,839 A | | 10/1999 | Johnson et al. |
| 6,119,087 A | | 9/2000 | Kuhn et al. |
| 6,130,933 A | * | 10/2000 | Miloslavsky ............. 379/90.01 |
| 6,240,448 B1 | | 5/2001 | Imielinski et al. |
| 6,243,443 B1 | | 6/2001 | Low et al. |
| 6,269,336 B1 | | 7/2001 | Ladd et al. |
| 6,366,658 B1 | | 4/2002 | Bjornberg et al. |
| 6,393,481 B1 | | 5/2002 | Deo et al. |
| 6,411,704 B1 | | 6/2002 | Pelletier et al. |
| 6,418,205 B2 | | 7/2002 | Capers et al. |
| 6,425,005 B1 | | 7/2002 | Dugan et al. |
| 6,427,002 B2 | | 7/2002 | Campbell et al. |
| 6,493,353 B2 | | 12/2002 | Kelly et al. |
| 6,512,818 B1 | | 1/2003 | Donovan et al. |

(Continued)

FOREIGN PATENT DOCUMENTS

WO 00/05638 A2 2/2000

(Continued)

OTHER PUBLICATIONS

Burger, E. and Oran, D., Internet Draft, "Requirements for Distributed Control of ASR, SV and TTG Resources," Jun. 13, 2002.

(Continued)

Primary Examiner—Jude J Jean Gilles

(57) ABSTRACT

A distributed service node includes a voice browser, media resources, such as automatic speech recognition (ASR) engines and text-to-speech (TTS) engines, and a resource manager. A media gateway converts between a pulse code modulation (PCM) format used in a circuit-switched telephone network and a real-time packet media format used by the distributed service node. A caller places a call to telephone number associated with the media gateway, and a real-time packet media session is established between the media gateway and the distributed service node. The voice browser queries a location server to determine the location of an interactive application associated with the called telephone number and then queries an application server corresponding to the location to obtain the interactive application as a voice extensible markup language (VXML) document. The browser interprets the VXML document and responsively invokes the media resources to provide an interactive media service to the caller.

18 Claims, 2 Drawing Sheets

U.S. PATENT DOCUMENTS

| | | | |
|---|---|---|---|
| 6,556,563 B1* | 4/2003 | Yarlagadda | 370/352 |
| 6,829,348 B1 | 12/2004 | Schroeder et al. | |
| 6,885,737 B1 | 4/2005 | Gao et al. | |
| 6,928,469 B1* | 8/2005 | Duursma et al. | 709/223 |
| 7,027,571 B1 | 4/2006 | Cook | |
| 2002/0032564 A1 | 3/2002 | Ehsani et al. | |
| 2002/0083166 A1 | 6/2002 | Dugan et al. | |
| 2002/0085705 A1 | 7/2002 | Shires | |
| 2002/0156900 A1 | 10/2002 | Marquette et al. | |
| 2002/0169615 A1 | 11/2002 | Kruger et al. | |
| 2003/0007609 A1 | 1/2003 | Yuen et al. | |
| 2003/0115066 A1* | 6/2003 | Seeley et al. | 704/270.1 |
| 2003/0202504 A1 | 10/2003 | Dhara et al. | |
| 2006/0184934 A1* | 8/2006 | Karlberg | 717/178 |

FOREIGN PATENT DOCUMENTS

WO 00/05643 A1 2/2000

OTHER PUBLICATIONS

Cisco Systems, Inc., "Cisco IP Interactive Voice Response Data Sheet 2.2," http://www.cisco.com/warp/public/cc/pd/unco/ipivr/prodlit/ipivo_ds.htm (Jul. 2, 2002).

SALT Form, "SALT: Speech Application Language Tags (SALT) 1.0 Specification," (Jul. 15, 2002).

Fielding, R. et al., Request for Comments: 2616, "Hypertext Transfer Protocol—HTTP/1.1," Jun. 1999.

Kabay, S. and Sage CJ., "The service node—an advanced IN services element," BT Technol J, vol. 13, No. 2, pp. 64-72, Apr. 1995.

SandCherry, Inc., "Simplifying Service Solutions: IVR Speech-enabled Multimodal Multimedia," 2002).

Maes, S. and Sakrajda, A, Internet Draft, "Speech Engine Remote Control Protocols by Treating Speech Engines and Audio Sub-systems as Web Services," Jun. 23, 2002.

Maes, S. and Sakrajda, A, Internet Draft, "Usage Scenarios for Speech Service Control (SPEECHSC)," Jun. 23, 2002.

Raggett, Dave, "Getting Started with VoiceXML 2.0: Introduction," (Nov. 14, 2001).

Robinson, F., Marquette, B. and Hernandez, R., Internet Draft, "Using Media Resource Control Protocol over SIP", Jan. 2, 2002.

Rosenberg, J. et al, Request for Comments: 3261, "SIP: Session Initiation Protocol," Jun. 2002.

SandCherry, Inc., "Voice Enabled Applications Deployed Using the Component Server Architecture," 2001.

Schulzrinne, H., et al, Request for Comments: 1889, "RTP: A Transport Protocol for Real-Time Applications," Jan. 1996.

Shanmugham, S. Monaco, P. and Eberman, B., Internet Draft, "MRCP: Media Resource Control Protocol," Jul. 15, 2002.

Adam Greenbaum, "Speech Application Language Tags (SALT), Technical White Paper," 2002.

W3C, "Voice Browser" Activity—Voice enabling the Web! News, Aug. 13, 2002.

W3C, "Voice Extensible Markup Language (VoiceXML) Version 2.0," W3C Working Draft, Apr. 24, 2002.

Office Action from related U.S. Appl. No. 11/282,407, mailed Oct. 22, 2007.

Office Action, mailed Sep. 17, 2008, in U.S. Appl. No. 11/282,407.

Notice of Allowance, mailed Jun. 11, 2009, in U.S. Appl. No. 11/282,407.

* cited by examiner

DISTRIBUTED INTERACTIVE MEDIA SYSTEM AND METHOD

BACKGROUND

1. Field of the Invention

The present invention relates to telecommunications and, more particularly, to distributed interactive media systems and methods.

2. Description of Related Art

Many telecommunications networks and other enterprises provide interactive media services, e.g., audio services, that users can access by telephone. An interactive audio system typically receives a call from a user, receives audio input from the user, such as speech or DTMF tones, and responsively provides the user with services, such as information, voice mail access, e-mail access, Web browsing, voice activated dialing (VAD), or the ability to do banking or other transactions. An interactive voice response (IVR) system is an example of an interactive audio system. Currently, such interactive audio systems are typically highly integrated, often with proprietary architectures. This makes the interactive audio systems difficult to modify so as to increase capacity or to provide new services. Such systems are also substantially expensive, making them out of reach for many enterprises. Accordingly, there is a need for flexible and low-cost systems and methods for providing interactive media services.

SUMMARY

In a first principal aspect, exemplary embodiments of the present invention relate to a distributed interactive media system comprising a location server, an application server, at least one media resource, and a browser. The location server stores a location of an interactive application. The application server stores the interactive application, in a predetermined format, at that location. The browser obtains the location from the location server and obtains the application in the predetermined format from the application server. The browser interprets the interactive application in the predetermined format and responsively invokes the at least one media resource.

In a second principal aspect, exemplary embodiments of the present invention relate to a method of providing an interactive media service. In accordance with the method, at least one call identifier, such as a called telephone number, is received. An interactive application is obtained, e.g., from a server, based on the at least one call identifier. A real-time packet media session is established with the at least one media resource. The at least one media resource is controlled during the real-time packet media session in accordance with the interactive media application.

DETAILED DESCRIPTION OF EXEMPLARY EMBODIMENTS

Figure 1:
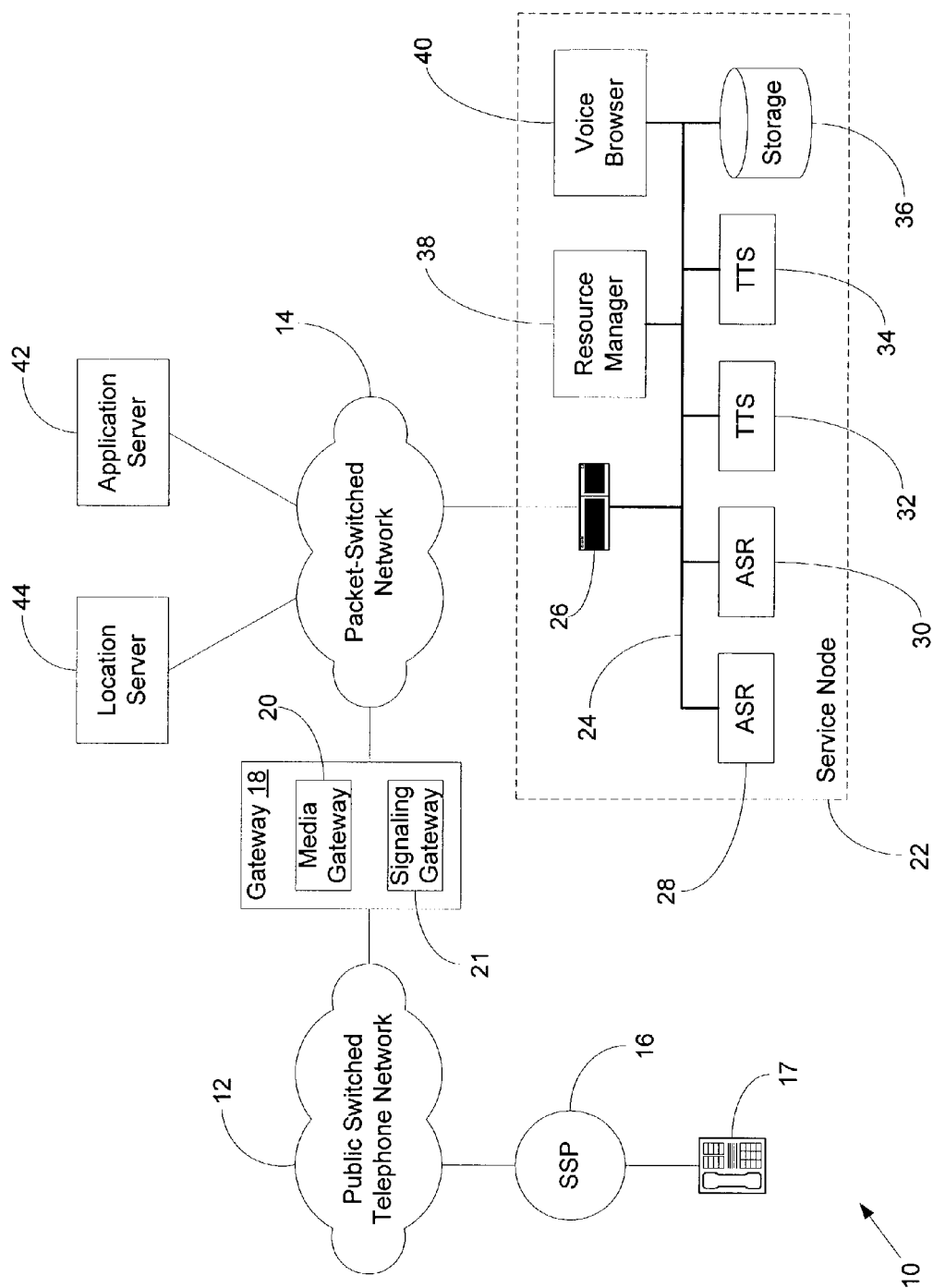
FIG. 1 is a simplified block diagram of a telecommunications system, in accordance with an exemplary embodiment of the present invention.

The present invention, in its preferred embodiments, provides a distributed interactive media system and method for providing interactive media services to users. In some cases, the user may use a conventional telephone, e.g., a POTS telephone, to access the interactive media service. In other cases, the user may access the interactive media service using other types of devices, such as fax machines, wireless telephones, personal digital assistants (PDAs), personal computers, or laptop computers. The interactive media service may involve audio, such as receiving speech or DTMF tones from the user and/or transmitting speech to the user. The interactive media service may also involve video and/or other media. In some cases, the interactive media service may be multimodal, i.e., may involve different media types. For example, a user may transmit speech, and the interactive media service may respond with graphics. The interactive media service may also involve voice activated dialing (VAD), voice Web browsing, data exchange, and/or handwriting recognition.

In an exemplary embodiment, the distributed interactive media system includes a media gateway connected to a circuit-switched telephone network, such as the public switched telephone network (PSTN), and a distributed service node communicatively coupled to the media gateway via a packet-switched network. The distributed service node may have access to a plurality of different interactive applications to provide a plurality of different interactive media services. For example, a user may call a telephone number to access a particular interactive media service, and the distributed service node may obtain an appropriate interactive application to provide that interactive media service based on an identifier of the call. The call identifier could be the called telephone number, the originating telephone number, a trunk group, or some other identifier of the user's call. The distributed service node may then use the call identifier to obtain the interactive application from another network element, such as an application server, optionally with the aid of a location server.

The distributed service node includes one or more media resource. Such media resources may include automatic speech recognition (ASR) engines, text-to-speech (TTS) engines, and/or other media resources. The distributed service node may include a browser, such as a voice browser, that invokes the media resources so as to provide the interactive media service. The distributed service node may also include a resource manager that manages usage of the media resources, for example for load balancing purposes. The media resources and other components of the distributed service node may communicate using a real-time packet media format, such as the real-time transport protocol (RTP). Relevant aspects of RTP are described in Schulzrinne, et al., "RTP: A Transport Protocol for Real-Time Applications," Request for Comments 1889 (January 1996), which is incorporated herein by reference.

The media gateway may be associated with one or more telephone numbers that a user could call to access interactive media services provided by the distributed service node. For example, a user may call one of the media gateway's telephone numbers, so that the circuit-switched telephone network routes the call to the media gateway. A signaling gateway may engage in signaling with the distributed service node to set up a real-time packet media session with the media gateway. As part of this signaling, the voice browser may receive the called telephone number and/or other call identifier. The voice browser may then obtain an interactive application based on the call identifier. During the interaction between the user and the distributed service node, the media gateway may convert between the pulse code modulation (PCM) format used in the circuit-switched telephone network and the real-time packet media format used by the distributed service node.

In an exemplary embodiment, the voice browser uses the called telephone number or other call identifier to obtain the interactive application from an application server, as a voice extensible markup language (VXML) document or in some other format. An exemplary VXML format is described in "Voice Extensible Markup Language (VoiceXML) Version 2.0" (Apr. 24, 2002 Working Draft of World Wide Web Consortium), which is incorporated herein by reference. In some cases, the voice browser may query a location server with the call identifier to obtain a location where the interactive application is stored, e.g., a location corresponding to an application server. During the real-time packet media session, the voice browser interprets the interactive application, as provided in the VXML or other format, and invokes the media resources in accordance with the application. In this way, the distributed service node provides the interactive media service requested by the user.

1. EXEMPLARY ARCHITECTURE

Referring to the drawings, FIG. 1 is a simplified block diagram of an exemplary telecommunications system 10 in which exemplary embodiments of the present invention may be employed. Telecommunications system 10 includes a circuit-switched network, such as public switched telephone network (PSTN) 12, and a packet-switched network 14. PSTN 12 may be connected to a variety of switching systems, including service switching points (SSPs), such as SSP 16, mobile switching centers (MSCs), and other switching systems. PSTN 12 may carry media in a PCM format, and PSTN 12 may route calls using an out-of-band signaling system, such as Signaling System 7 (SS7). Various telephony devices, such as telephones, fax machines, or modems, may be able to use the switching systems connected to PSTN 12 to send and receive calls. For example, FIG. 1 shows a landline telephone 17 connected to SSP 16. Alternatively, telephony devices may send and receive calls wirelessly, for example, by using switching systems such as MSCs.

Packet-switched network 14 may include one or more local area networks (LANs) and/or one or more wide area networks (WANs), such as the Internet. Packet-switched network 12 may route packets based on network addresses, such as by using the Internet Protocol (IP) protocol in combination with the User Datagram Protocol (UDP) or Transmission Control Protocol (TCP). The IP packets may be carried over lower level protocols, such as asynchronous transfer mode (ATM) protocols. In addition, higher-level applications and protocols, such as the Session Initiation Protocol (SIP) and the HyperText Transfer Protocol (HTTP), may be carried as UDP/IP or TCP/IP packets in packet-switched network 14. Relevant aspects of SIP are described in Rosenberg, et al., "SIP: Session Initiation Protocol," Request for Comments 3261 (June 2002), which is incorporated herein by reference. A recent version of HTTP is described in "Hypertext Transfer Protocol—HTTP/1.1," Request for Comments 2616 (June 1999), which is incorporated herein by reference.

A gateway 18 allows communication between PSTN 12 and packet-switched network 14. Gateway 18 may include a media gateway 20 that conveys media between PSTN 12 and packet-switched network 14 and converts between media formats. For example, media gateway 20 may convert between a PCM format used in PSTN 12 and a real-time packet format, e.g., in accordance with RTP, used in packet-switched network 14. Gateway 18 may also include a signaling gateway 21 that converts between signaling formats. For example, signaling gateway 21 may convert between SS7 signaling used in PSTN 12 and SIP or other signaling used in packet-switched network 14. Gateway 18 could also perform other functions. For example, gateway 18 could be part of an interactive voice response (IVR) system. In addition, although FIG. 1 shows signaling gateway 21 associated with media gateway 20 in gateway 18, other configurations are possible. For example, signaling gateway 21 could be integrated with media gateway 20. Alternatively, gateway 18 could have a distributed architecture. For example, media gateway 20 and signaling gateway 21 could be separate network elements in communication via packet-switched network 14.

Media gateway 20 may be associated with one or more telephone numbers. Thus, a call placed to one of these telephone numbers, e.g., using telephone 17, may be routed to media gateway 20 through PSTN 12, e.g., using SS7 signaling. In response to this SS7 signaling, signaling gateway 21 may engage in further signaling to establish a real-time packet media session, such as an RTP session, between media gateway 20 and another network element, e.g., via packet-switched network 14. The particular network element that signaling gateway 21 signals may depend on the called telephone number or other call identifier. In this way, a caller using a telephony device connected to PSTN 12, such as telephone 17, may exchange audio or other media with another network element, via a PSTN call and a real-time packet media session bridged together by media gateway 20.

As shown in FIG. 1, telecommunications system 10 includes a service node 22 is connected to packet-switched network 14. As described in more detail below, service node 22 is able to provide interactive media services to users. In some cases, users may reach service node 22 via media gateway 20. For example, a user may use a telephony device, such as telephone 17, to call a telephone number associated with media gateway 20. A real-time packet media session may then be established between media gateway 20 and service node 22 to allow real-time communication of audio or other media between the user and service node 22. In other cases, users may reach service node 22 without going through media gateway 20 or without using a telephony device. For example, a user may use a computer equipped with audio and/or video devices to access service node 22 via packet-switched network 14, e.g., using SIP signaling, without going through media gateway 20 or PSTN 12.

Service node 22 may have a distributed architecture. For example, as shown in FIG. 1, service node 22 includes a number of components that are interconnected by a local area network (LAN) 24. In this example, service node 22 includes a router 26 to route packets between LAN 24 and packet-switched network 14. In other cases, the components of service node 22 may be even more widely distributed. For example, some or all of the components of service node 22 may be interconnected via a wide area network (WAN) or via several LANs or WANs, which may be a part of packet-switched network 14.

Service node 22 includes one or more media resources. For example, service node 22 may include automatic speech recognition (ASR) engines 28 and 30 and text-to-speech (TTS) engines 32 and 34. ASRs 28 and 30 are able to receive speech in a real-time packet format, e.g., using RTP, and provide a textual interpretation of the speech, i.e., to convert speech into text. ASRs 28 and 30 may also be able to recognize other audio signals, such as DTMF tones. TTSs 32 and 34 are able to transmit synthesized speech in a real-time packet format, e.g., using RTP, based on text that they receive, i.e., to convert text into speech. Such ASR and TTS engines are commercially available, for example, from Nuance Communications, Inc., Menlo Park, Calif. Service node 22 may also include a storage system 36. Storage system may include volatile data storage, such random access memory (RAM), and/or non-volatile data-storage, such as read-only memory (ROM), magnetically encoded tape, magnetically encoded disk, or optically encoded disk. Storage system 36 may provide one or more databases for storing user data or other data. Although service node 22 is shown in FIG. 1 with two ASRs, two TTSs, and one storage system, service node 22 may include a greater or fewer number of these components. Service node 22 could also include other media resources, such as voice activated dialers, streaming audio and/or video players, multi-modal servers (which may switch between media types during interaction with users), multi-media servers (which may use more than one media type at a time), and/or messaging servers (which enable users to send and/or receive voice mail, e-mail, and/or instant messages).

In an exemplary embodiment, the media resources, including ASRs 28 and 30 and TTSs 32 and 34, may be controlled using an appropriate protocol, preferably an "open standard" protocol. One protocol that could be used is the Media Resource Control Protocol (MRCP). Relevant aspects of MRCP are described in Shanmugham, et al., "MRCP: Media Resource Control Protocol," Internet-Draft draft-shanmugham-mrcp-02 (Jul. 15, 2002) and Robinson, et al., "Using Media Resource Control Protocol over SIP," Internet-Draft draft-robinson-mrcp-sip-00 (Jan. 2, 2002), which are incorporated herein by reference. Another protocol that could be used is Speech Application Language Tags (SALT). Relevant aspects of SALT are described in "Speech Application Language Tags (SALT) 1.0 Specification" (Jul. 15, 2002), which is incorporated herein by reference. Alternatively, the media resources may be controlled using other protocols or in other ways.

Service node 22 also includes a resource manager 38. Resource manager 38 manages the usage of the media resources, such as ASRs 28 and 30, TTSs 32 and 34, storage system 36, and voice browser 40. For example, resource manager 38 may establish the availability of a media resource before allocating it for a particular real-time packet media session. Resource manager 38 may also do load balancing of the media resources. For example, if ASR 28 is available but is already being used for one real-time packet media session, then, for another real-time packet media session being carried on simultaneously, resource manager 38 may instead use ASR 30. To enable resource manager 38 to perform its management functions, much of the signaling within service node 22 may go through resource manager 38, as described in more detail below.

Service node 22 also includes a voice browser 40. As described in more detail below, voice browser 40 interprets interactive applications, which may be provided in a VXML or other format, and invokes media resources, e.g., ASR 28 and TTS 33, in accordance with the interactive applications, so as to provide the interactive media service to the user. More particularly, voice browser may use MRCP commands to invoke the media resources. The MRCP commands may be carried in SIP messages, which, in turn, may be proxied by resource manager 38. Service node 22 may also include other components. For example, service node 22 may include media gateway 20 and/or signaling gateway 21. Thus, media and/or signaling from PSTN 12 could reach service node 22 via one or more gateways without going through packet-switched network 14.

Telecommunications system 10 may also include an application server 42 connected to packet-switched network 14. Application server 42 stores one or more interactive applications in a format such as VXML. Application server 42 may store each interactive application at a location that may be identified by a Universal Resource Locator (URL). In some cases, application server 42 may be part of an interactive voice response (IVR) system.

Voice browser 40 can obtain an interactive application from application server 42, e.g., as a VXML document, by sending application server 42 an HTTP GET request with a URL associated with the interactive application. Alternatively, voice browser 40 may send the HTTP GET request with the URL to an intermediary node, such as a proxy server, gateway, or portal. The intermediary node may then retrieve the interactive application from application server 42 on behalf of voice browser 40 and forward it to voice browser 40.

Each interactive application may be associated with one or more call identifiers. A call identifier could correspond to a called telephone number, i.e., the telephone number the user calls to access the interactive media service provided by the interactive application. Alternatively, a call identifier could correspond to the originating telephone number, trunk group, or other identifier of a user's call. Voice browser 40 may use such call identifiers to obtain the appropriate interactive media applications. In particular, when a user places a call to access an interactive media service provided by service node 22, voice browser 40 may include a call identifier, such as the called telephone number, in the request it sends to application server 42 (either directly or via one or more intermediary nodes). The call identifier may be part of a URL included in the request, or may be included in some other field of the request.

Telecommunication system 10 may also include a location server 44 connected to packet-switched network 14. Location server 44 stores the locations of interactive applications, e.g., URLs corresponding to application server 42. Location server 44 may also keep track of what call identifiers are associated with what interactive applications. In an exemplary embodiment, voice browser 40 obtains the location of an interactive application by sending location server 44 a query that includes the call identifier associated with the interactive application. In this regard, location server 44 may function as a redirection server. Thus, voice browser 40 may send location server 44 an HTTP GET request with the called telephone number or other call identifier, and location server 44 may respond with the URL of the interactive application stored on application server 42. Alternatively, location server 44 may function as a proxy server, gateway, or other type of intermediary, by retrieving the interactive application from application server 42 in response to an HTTP GET request that includes a call identifier associated with the interactive application.

Although FIG. 1 shows only one application server, telecommunication system 10 could include a plurality of application servers. Moreover, different interactive applications could be stored in different application servers. Location server 44 could be used to keep track of the locations of the interactive applications, and the locations could be keyed to the call identifiers associated with the interactive applications. In this way, voice browser 40 could send location server 44 a query that includes the telephone number called by the user (or other call identifier), and location server 44 could respond with a URL with which voice browser 40 can use to access the particular application server that has the interactive application associated with the call identifier.

2. EXEMPLARY OPERATION

Figure 2:
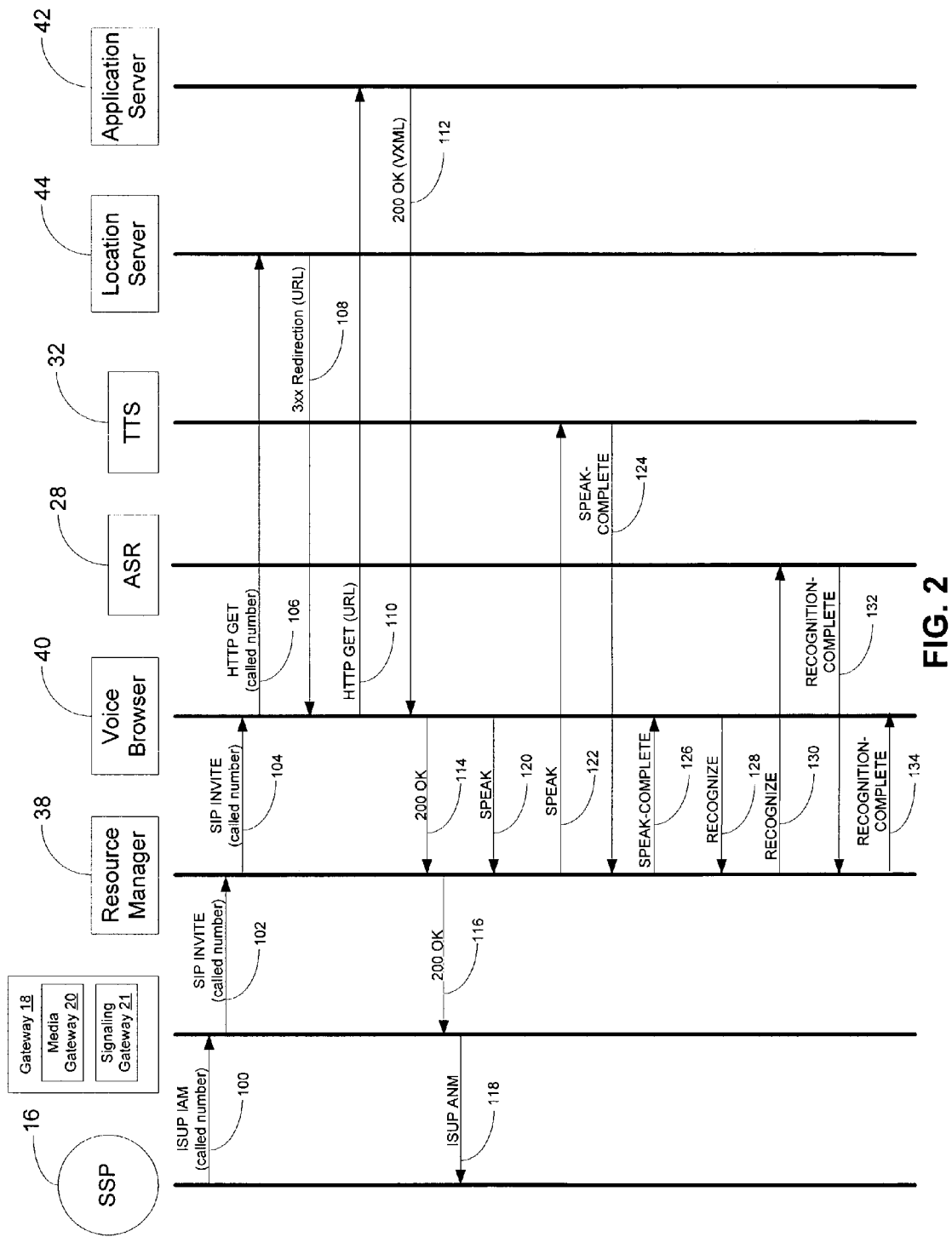
FIG. 2 is a simplified call flow diagram, in accordance with an exemplary embodiment of the present invention.

FIG. 2 is a simplified call flow diagram for an exemplary method of using service node 22 to provide an interactive media service. The process may begin when a user, such as a user of telephone 17, dials a telephone number associated with media gateway 20 (shown as part of gateway 18). In response, SSP 16 signals to media gateway 20, using an SS7 ISUP IAM message, as indicated by step 100. The ISUP IAM message may include various call identifiers, such as the called telephone number.

In response to the ISUP IAM message of step 100, signaling gateway 21 (shown as part of gateway 18) signals service node 22 to establish a real-time packet media session with media gateway 20. For example, signaling gateway 21 may send resource manager 38 a SIP INVITE message, as indicated by step 102. The SIP INVITE message may use the Session Description Protocol (SDP) to indicate that an RTP session is requested. The SIP INVITE message may also include a call identifier, such as the called telephone number. For example, the "To" field of the SIP INVITE message, which identifies the logical recipient of the request, may identify a URL that includes the called telephone number. Resource manager 38, in turn, acts as a proxy server and forwards the SIP INVITE message, with the call identifier, to voice browser 40, as indicated by step 104.

Voice browser 40 then obtains the interactive application, e.g., as a VXML document, associated with the called telephone number or other call identifier. To do this, voice browser 40 may query location server 44 to obtain the location of the interactive application. For example, voice browser 40 may send an HTTP GET request to location server 44, as indicated by step 106. The request includes the called telephone number or other call identifier, e.g., as part of a URL included in the request. Acting as a redirection server, location server 44 responds with a 3xx Redirection response, as indicated by step 108. The response includes the URL of the interactive application associated with the called telephone number or other call identifier. In this case, the URL returned in step 108 corresponds to application server 42. Accordingly, voice browser 40 then sends an HTTP GET request with this URL to application server 42, as indicated by step 110. In response, application server 42 sends a 200 OK response that includes the interactive application in the form of a VXML document, as indicated by step 112.

As indicated by step 114, voice browser 40 then sends resource manager 38 a 200 OK message in response to the SIP INVITE message of step 104. Resource manager 38, in turn, sends gateway 18 a 200 OK message in response to the SIP INVITE message of step 102, as indicated by step 116. Gateway 18 may then send an SS7 signal, such as an ISUP ANM message, to SSP 16, as indicated by step 118. In this way, a circuit-switched connection, e.g., including one or more trunks, may be established between SSP 16 and media gateway 20 and a real-time packet media session may be established between media gateway 20 and service node 22. Then, SSP 16 and media gateway 20 can exchange media in a PCM format, and media gateway 20 and service node 22 can exchange the media in a real-time packet format, e.g., using RTP.

During the real-time packet media session, voice browser 40 interprets the VXML document obtained from application server 42 and invokes media resources, such as TTS and ASR engines in accordance with the interactive application. For example, the interactive application may call for certain text, as specified in the VXML document, to be spoken to the user. Accordingly, voice browser 40 may send resource manager 38, an MRCP SPEAK message, with the speech text and other speech parameters, to invoke a TTS engine, as indicated by step 120. Resource manager 38 then determines which TTS engine to use for the session. In this case, resource manager 38 determines to use TTS engine 32 and, thus, forwards the MRCP SPEAK message to TTS engine 32, as indicated by step 122. In response, TTS engine 32 synthesizes the speech corresponding to the text and transmits the speech in the form of real-time packets. When TTS engine 32 has completed the speech synthesis, TTS engine 32 transmits an MRCP SPEAK-COMPLETE message to resource manager 38, as indicated by step 124. Resource manager 38 then forwards the MRCP SPEAK-COMPLETE message to voice browser 40, as indicated by step 126.

The interactive application may also call for speech recognition. Accordingly, voice browser 40 may send resource manager 38 an MRCP RECONGIZE message, with a grammar to match for and other parameters, to invoke an ASR engine, as indicated by step 128. Resource manager 38 then determines which ASR engine to use for the session. In this case, resource manager 38 determines to use ASR engine 28 and, thus, forwards the MRCP RECOGNIZE message to ASR engine 28, as indicated by step 130. In response, ASR engine 28 receives real-time packets corresponding to speech from the user and attempts to recognize the speech. When speech recognition is complete, ASR engine 28 sends via resource manager 38, an MRCP RECOGNITION-COMPLETE message with a textual or other interpretation of the speech, as indicated by step 132. Resource manager 38 then forwards the MRCP RECOGNITION-COMPLETE message to voice browser 40, as indicated by step 134. In this way, service node 22 may provide an interactive media service to the user.

3. EXEMPLARY ADVANTAGES

In contrast to conventional interactive media systems, such as IVRs, which are often highly integrated, the present invention, in preferred embodiments, provides a more flexible approach. By using a distributed architecture and known, publicly available "open standard" protocols, service node 22 can be updated more easily than a highly integrated IVR. For example, to increase capacity, additional media resources, such as additional ASRs and/or TTSs, can be added to service node 22. To provide improved performance and/or additional capabilities, the ASRs, TTSs, or other media resources can be replaced with newer versions.

Storing interactive applications in application server 42 separate from service node 22 can also provide advantages. For instance, a single application server may serve several different service nodes, which may be in different locations. Storing an interactive application in one central location, e.g., application server 42, can make the interactive application more easy to update and more easy to apply to all the service nodes served by the application server.

In addition, service node 22 can also be used to provide a number of different interactive media services on behalf of a number of different enterprises. Thus, to provide users with an interactive media service, an enterprise need not purchase an IVR of its own. Instead, the enterprise may simply write an interactive application, e.g., in the form of a VXML document, to define the service and store the application on application server 42. Service node 22 may then "host" the interactive application when a user calls a telephone number associated with the interactive application. In particular, service node 22 may use location server 44 to find where the interactive application associated with the called telephone number is stored. Service node 22 may then retrieve the interactive application from the identified location, e.g., corresponding to application server 42, and then execute it to provide the interactive media service to the user. In this way, an enterprise may be able to provide interactive media services at a lower cost than purchasing an IVR.

Similarly, an IVR that is already being used by an enterprise may invoke the resources of service node 22 to help provide interactive media services. In particular, the IVR may provide some interactive media services on its own but may use service node 22 to provide other interactive media services. For example, the IVR may receive a call to a telephone number associated with an interactive media service that service node 22 can provide. In response, the IVR may engage in signaling with service node 22 to establish a real-time packet media session with a media gateway in the IVR. Alternatively, the IVR may begin providing interactive services to a caller and then invoke service node 22 to access certain selected media resources or when the IVR encounters certain branch points in its interaction with the caller. To determine how to provide the interactive media service, service node 22 may obtain an interactive media application, e.g., as a VXML document. Specifically, service node 22 may obtain the interactive media application from an application server, such as application server 42, using a URL that may be obtained from location server 44 or from the IVR itself. In addition, the IVR may itself function as the application server. In this way, an enterprise may use service node 22 to enhance the capacity and/or capabilities of an existing IVR.

4. CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A distributed interactive media system, said system comprising:
   a location server, said location server storing a location of an interactive application;
   an application server, said application server storing, at said location, said interactive application in a predetermined format, said interactive application calling for spoken text and speech recognition;
   a plurality of media resources, said plurality of media resources including at least one automatic speech recognition (ASR) engine and at least one text-to-speech (TTS) engine;
   a resource manager for managing usage of said media resources; and
   a browser, said browser obtaining said location from said location server and said interactive application in said predetermined format from said application server, said browser invoking said media resources through said resource manager in accordance with said interactive application, wherein said browser invokes said at least one TTS engine when said interactive application calls for spoken text and invokes said at least one ASR engine when said interactive application calls for speech recognition.

2. The distributed interactive media system of claim 1, further comprising:
   a media gateway, communicatively coupled to a circuit-switched network and to said media resources, said media gateway converting between a first media format used by said circuit-switched network and a second media format used by said media resources.

3. The distributed interactive media system of claim 2, wherein said first media format is a pulse code modulation (PCM) format and said second media format is a real-time packet format.

4. The distributed interactive media system of claim 1, further comprising:
   a signaling gateway for converting between a first signaling format used by said circuit-switched network and a second signaling format used by said resource manager.

5. The distributed interactive media system of claim 1, wherein said predetermined format is a markup language.

6. The distributed interactive media system of claim 1, wherein said browser is a voice browser and wherein said predetermined format is a voice extensible markup language (VXML).

7. The distributed interactive media system of claim 1, wherein said location server associates said location with at least one call identifier.

8. The distributed interactive media system of claim 7, wherein said at least one call identifier includes a called telephone number.

9. The distributed interactive media system of claim 7, wherein said location server functions as a redirection server by identifying said location in response to requests identifying said at least one call identifier.

10. The distributed interactive media system of claim 9, wherein said browser:
    (a) receives said at least one call identifier;
    (b) sends a first request to said location server, said first request identifying said at least one call identifier;
    (c) receives said location from said location server in response to said first request;
    (d) sends a second request to said application server, said second request identifying said location; and
    (e) receives said interactive application in said predetermined format in response to said second request.

11. A method of providing an interactive media service, said method comprising:
    receiving a called telephone number that identifies a call from a user;
    receiving a location from a location server in response to a first request, said first request identifying said called telephone number;
    receiving an interactive application from an application server in response to a second request, said second request identifying said location;
    establishing a real-time packet media session with at least one media resource; and
    controlling said at least one media resource during said real-time packet media session in accordance with said interactive application to provide said interactive media service to said user.

12. The method of claim 11, wherein a gateway associated with said called telephone number receives said call.

13. The method of claim 12, further comprising:
    during said real-time packet media session, said gateway converting between a pulse code modulation (PCM) format and a real-time packet format used by said at least one media resource.

14. The method of claim 12, further comprising:
    a browser receiving said called telephone number from said gateway.

15. The method of claim 11, wherein a browser sends said first request to said location server and receives said location from said location server in response to said first request, and wherein said browser sends said second request to said application server and receives said interactive application from said application server in response to said second request.

16. The method of claim 11, wherein controlling said at least one media resource during said real-time packet media session in accordance with said interactive media application comprises a browser interpreting said interactive application and responsively invoking said at least one media resource.

17. The method of claim 16, wherein said at least one media resource includes at least one automatic speech recognition (ASR) engine, wherein said ASR engine receives speech during said real-time packet media session and provides said browser with a textual interpretation of said speech.

18. The method of claim 16, wherein said at least one media resource includes at least one text-to-speech (TTS) engine, wherein said TTS engine receives text from said browser and transmits speech during said real-time packet media session based on said text.

* * * * *